United States Patent
Hamamura et al.

(10) Patent No.: US 12,515,477 B2
(45) Date of Patent: Jan. 6, 2026

(54) PNEUMATIC TIRE

(71) Applicant: SUMITOMO RUBBER INDUSTRIES, LTD., Kobe (JP)

(72) Inventors: Kenji Hamamura, Kobe (JP); Hiroki Kawai, Kobe (JP); Subaru Toya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 159 days.

(21) Appl. No.: 18/017,614

(22) PCT Filed: Jul. 26, 2021

(86) PCT No.: PCT/JP2021/027581
§ 371 (c)(1),
(2) Date: Jan. 23, 2023

(87) PCT Pub. No.: WO2022/025006
PCT Pub. Date: Feb. 3, 2022

(65) Prior Publication Data
US 2023/0264518 A1 Aug. 24, 2023

(30) Foreign Application Priority Data
Jul. 28, 2020 (JP) ................. 2020-127612

(51) Int. Cl.
*B60C 3/04* (2006.01)
*B60C 1/00* (2006.01)
*B60C 11/00* (2006.01)
*B60C 11/03* (2006.01)
*B60C 11/13* (2006.01)

(52) U.S. Cl.
CPC .............. *B60C 1/0016* (2013.01); *B60C 3/04* (2013.01); *B60C 11/005* (2013.01); *B60C 11/033* (2013.01); *B60C 11/13* (2013.01); *B60C 2011/0025* (2013.01); *B60C 2011/0033* (2013.01); *B60C 2011/0353* (2013.01); *B60C 2011/0355* (2013.01); *B60C 2011/0365* (2013.01); *B60C 2011/0367* (2013.01); *B60C 2011/0374* (2013.01); *B60C 2011/0376* (2013.01); *B60C 2011/0379* (2013.01); *B60C 2200/04* (2013.01)

(58) Field of Classification Search
CPC .......................... B60C 2011/0025; B60C 3/04
See application file for complete search history.

(56) References Cited

U.S. PATENT DOCUMENTS

| | | | |
|---|---|---|---|
| 4,811,771 A * | 3/1989 | Shoemaker | B60C 3/04 152/454 |
| 5,087,668 A * | 2/1992 | Standstrom | B60C 1/0016 152/905 |
| 5,293,918 A * | 3/1994 | Tsuda | B60C 11/0309 152/209.15 |
| 5,309,963 A * | 5/1994 | Kakumu | B60C 11/033 152/902 |
| 2002/0092591 A1* | 7/2002 | Cortes | B60C 11/0309 152/209.16 |
| 2008/0264543 A1 | 10/2008 | Montanaro et al. | |
| 2010/0108213 A1 | 5/2010 | Miyazaki | |
| 2014/0138003 A1* | 5/2014 | Kuwayama | B60C 3/04 152/454 |
| 2017/0166012 A1 | 6/2017 | Todoroki | |
| 2018/0126785 A1 | 5/2018 | Navarro-Losada et al. | |
| 2018/0215207 A1 | 8/2018 | Hatanaka et al. | |
| 2018/0244104 A1 | 8/2018 | Kuwayama et al. | |
| 2018/0272800 A1 | 9/2018 | Kuwayama et al. | |
| 2020/0032037 A1 | 1/2020 | Takano et al. | |
| 2020/0317890 A1 | 10/2020 | Hatanaka | |
| 2021/0039437 A1 | 2/2021 | Oka | |

(Continued)

FOREIGN PATENT DOCUMENTS

| | | |
|---|---|---|
| CN | 109627509 A | 4/2019 |
| EP | 0 847 880 A1 | 6/1998 |

(Continued)

OTHER PUBLICATIONS

Machine Translation: JP-2005280511-A, Tahara N, (Year: 2024).*
International Search Report (PCT/ISA/210) issued in PCT/JP2021/027581, dated Oct. 12, 2021.
Written Opinion of the International Searching Authority (PCT/ISA/237) issued in PCT/JP2021/027581, dated Oct. 12, 2021.
"ETRTO Standards Manual 2018," ETRTO, 2018, (21 pages total).
English machine translation of JP 2016-74408, dated May 12, 2016.
English machine translation of JP 2016-94552-A, dated May 26, 2016.

(Continued)

*Primary Examiner* — Kendra Ly
(74) *Attorney, Agent, or Firm* — Birch, Stewart, Kolasch & Birch, LLP

(57) ABSTRACT

The present invention provides a pneumatic tire which is sufficiently reduced in the rolling resistance during high-speed travel, while having sufficiently improved chipping resistance. A pneumatic tire which has a tread part, wherein: at least one rubber layer that forms the tread part contains a rubber component that contains an isoprene rubber, a styrene butadiene rubber and a butadiene rubber, while containing more than 5 parts by mass but 25 parts by mass or less of carbon black relative to 100 parts by mass of the rubber component; and if Wt (mm) is the cross-sectional width of the tire, Dt (mm) is the outer diameter of the tire, and V (mm$^3$) is the virtual volume that is the volume of the space occupied by the tire when this pneumatic tire is installed on a standardized rim and the internal pressure is 250 kPa, (formula 1) and (formula 2) are satisfied.

$1700 \leq (Dt^2 \times \pi/4)/Wt \leq 2827.4$ (formula 1)

$[(V+1.5 \times 10^7)/Wt] \leq 2.88 \times 10^5$ (formula 2)

16 Claims, No Drawings

(56) References Cited

U.S. PATENT DOCUMENTS

| | | |
|---|---|---|
| 2021/0198458 A1 | 7/2021 | Murase |
| 2022/0017727 A1 | 1/2022 | Murase |

FOREIGN PATENT DOCUMENTS

| | | | |
|---|---|---|---|
| EP | 1 043 178 A1 | | 10/2000 |
| EP | 2 993 062 A1 | | 3/2016 |
| EP | 3 130 479 A1 | | 2/2017 |
| JP | 6-102149 A | | 4/1994 |
| JP | 10-175403 A | | 6/1998 |
| JP | 2000-289411 A | | 10/2000 |
| JP | 2005280511 A | * | 10/2005 |
| JP | 2014-201281 A | | 10/2014 |
| JP | 2016-74408 A | | 5/2016 |
| JP | 2016-94552 A | | 5/2016 |
| JP | 2017-52329 A | | 3/2017 |
| JP | 2017-52330 A | | 3/2017 |
| JP | 2017-52361 A | | 3/2017 |
| JP | 2017-109527 A | | 6/2017 |
| JP | 2017-171853 A | | 9/2017 |
| JP | 2017-206194 A | | 11/2017 |
| JP | 2018-178034 A | | 11/2018 |
| JP | 2019-89911 A | | 6/2019 |
| JP | 2019-135117 A | | 8/2019 |
| JP | 2019-206643 A | | 12/2019 |
| JP | 2020-97644 A | | 6/2020 |
| WO | WO 2017/209264 A1 | | 12/2017 |
| WO | WO 2018/186367 A1 | | 10/2018 |

OTHER PUBLICATIONS

English machine translation of JP 2017-206194, dated Nov. 24, 2017.

Patent Opposition to the corresponding Japanese Patent JP6835284B, dated Aug. 20, 2021, with partial English translation.

Extended European Search Report for European Application No. 21850750.7, dated Jun. 27, 2024.

English translation of Japanese Office Action for Japanese Application No. 2021-005643, dated May 7, 2024.

* cited by examiner

PNEUMATIC TIRE

TECHNICAL FIELD

The present disclosure relates to a pneumatic tire.

BACKGROUND ART

In recent years, from the viewpoint of increasing interest in environmental issues and economic efficiency, there has been a growing demand for fuel efficiency in automobiles, and there is a strong demand for improved fuel efficiency also in pneumatic tires (hereinafter, simply referred to as "tires") installed in automobiles.

The fuel efficiency of a tire can be evaluated by rolling resistance, and it is known that the smaller the rolling resistance, the better the fuel efficiency of the tire.

Therefore, conventionally, it has been proposed to reduce the rolling resistance by devising the formulation of the rubber composition constituting the tread portion of the tire (for example, Patent Documents 1 to 4).

PRIOR ART DOCUMENTS

Patent Document

[Patent Document 1] JP2018-178034A
[Patent Document 2] JP2019-089911A
[Patent Document 3] WO2018/186367A
[Patent Document 4] JP2019-206643A

SUMMARY OF INVENTION

Problem to be Solved by the Invention

However, it cannot be said that the tire manufactured by the above-mentioned conventional technology is sufficiently reduced in rolling resistance during high-speed running, and further reduction is desired. And it cannot be said that these tires have sufficient chipping resistance.

Therefore, an object of the present disclosure is to provide a pneumatic tire in which the rolling resistance during high-speed running is sufficiently reduced and its chipping resistance is sufficiently improved.

Means for Solving the Problem

The present discloser has diligently studied the solution to the above-mentioned problem, found that the above-mentioned problem can be solved by the disclosure described below, and has completed the present disclosure.

The present disclosure is;
a pneumatic tire having a tread portion, wherein
at least one of the rubber layers forming the tread portion contains a rubber component containing isoprene-based rubber, styrene-butadiene rubber and butadiene rubber, and more than 5 parts by mass and 25 parts by mass or less of carbon black with respect to 100 parts by mass of the rubber component; and,
when the cross-sectional width of the tire is Wt (mm), the outer diameter is Dt (mm), and the volume of the space occupied by the tire is the virtual volume V (mm$^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \qquad \text{(formula 1)}$$

$$[(V+1.5\times10^7)/Wt] \leq 2.88\times10^5 \qquad \text{(formula 2)}$$

The Effect of the Invention

According to the present disclosure, it is possible to provide a pneumatic tire in which the rolling resistance during high-speed running is sufficiently reduced and its chipping resistance is sufficiently improved.

EMBODIMENTS FOR CARRYING OUT THE INVENTION

[1] Features of the Tire of the Present Disclosure

First, the features of the tire according to the present disclosure will be described.
1. Overview The tire according to the present disclosure is characterized in that at least one of the rubber layers forming the tread portion contains a rubber component containing isoprene-based rubber, styrene-butadiene rubber and butadiene rubber, and is formed of a rubber composition containing more than 5 parts by mass and 25 parts by mass or less of carbon black with respect to 100 parts by mass of the rubber component.

The tire according to the present disclosure is characterized also in that, when the cross-sectional width of the tire is Wt (mm), the outer diameter is Dt (mm), and the volume of the space occupied by the tire is the virtual volume V (mm$^3$), when the tire is installed on a standardized rim and the internal pressure is 250 kPa, the tire satisfies following (formula 1) and (formula 2):

$$1700 \leq (Dt^2 \times \pi/4)/Wt \leq 2827.4 \qquad \text{(formula 1)}$$

$$[(V+1.5\times10^7)/Wt] \leq 2.88\times10^5 \qquad \text{(formula 2)}$$

The physical properties of the rubber composition forming the tread portion and the shape of the tire have the characteristics described above, thereby a tire with sufficiently reduced rolling resistance during high-speed running and sufficiently improved chipping resistance can be provided.

In the above description, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

Further, the outer diameter Dt of the tire is the outer diameter of the tire installed on a standardized rim, having an internal pressure of 250 kPa and in a no-load state. The cross-sectional width Wt (mm) of the tire is the width of tire installed on a standardized rim, having an internal pressure of 250 kPa and in a no-load state, and is the distance excluding patterns, letters, and the like on the tire side from the linear distance between the sidewalls (total width of the tire) including all the patterns, letters and the like on the tire side.

Further, the virtual volume V (mm$^3$) of the tire is, specifically, can be calculated by the following formula:

$$V=[(Dt/2)^2-\{(Dt/2)-Ht\}^2]\times\pi\times Wt$$

based on the outer diameter of tire Dt (mm), the tire cross-sectional height (distance from the bottom of the bead to the outermost surface of the tread; ½ of the difference between the tire outer diameter and the nominal rim diameter) Ht (mm), and the cross-sectional width of tire Wt (mm), in the state the tire is installed on a standardized rim, the internal pressure is 250 kPa and no load is applied.

2. Mechanism of Effect Manifestation in Tire According to the Present Disclosure The mechanism of effect manifestation in the tire according to the present disclosure, that is, the mechanism of the rolling resistance being sufficiently reduced at high-speed running, and the durability being sufficiently improved, is presumed as follows.

(1) Tire Shape

As described above, in the present disclosure, the cross-sectional width Wt (mm) and the outer diameter Dt (mm) of the tire are set to satisfy 1700≤(Dt$^2$×π/4)/Wt≤2827.4 (formula 1).

By increasing [(Dt/2)$^2$×π)=(Dt$^2$×π/4)], the area when the tire is viewed from the lateral direction, with respect to the cross-sectional width Wt of the tire, and satisfying the numerical range specified in formula 1, the repetition of deformation per unit time is reduced, as a result, the time that can be used for heat exchange is increased, thereby improving the heat release property of the side portion, and the friction between the tread portion and the road surface can be reduced, and it is considered that low rolling resistance can be achieved. In (formula 1), (Dt$^2$×π/4)/Wt is further preferably 1735 or more, further preferably 1737 or more, further preferably 1749 or more, further preferably 1751 or more, further preferably 1753 or more, further preferably 1758 or more, further preferably 1760 or more, further preferably 1787 or more, further preferably 1801 or more, further preferably 1818 or more, further preferably 1853 or more, further preferably 1856 or more, further preferably 1864 or more, further preferably 1865 or more, further preferably 1963.5 or more, further preferably 2008 or more, further preferably 2010 or more, further preferably 2015 or more, further preferably 2016 or more, further preferably 2018 or more, and further preferably 2031 or more.

However, if the tread portion of such a tire slips on a rough road surface such as sandy ground, the input applied to the tread surface becomes more severe than before, and chipping may occur.

In addition, since the centrifugal force during rolling increases at high-speed running, there is a risk that the radius of the tire will grow significantly during rolling, and that the input applied to the tread when slipping will become more severe. Furthermore, in such a high-speed running state, the tread portion becomes rounded and the amount of deformation increases, so there is room for further improvement in reducing rolling resistance during high-speed running.

Therefore, in the present disclosure, the virtual volume V (mm$^3$) and the cross-sectional width Wt (mm) of the tire are tried to satisfy [(V+1.5×10$^7$)/Wt]≤2.88×10$^5$ (formula 2).

In this way, the virtual volume V of the tire is reduced in accordance with the decrease in the cross-sectional width Wt of the tire to reduce the volume of the tire itself, the growth rate of the outer diameter due to centrifugal force is reduced, the growth of the outer diameter during rolling is suppressed, and the input applied to the tread at the time of slipping can be reduced, and it is considered that the occurrence of chipping can be suppressed. Also, during high-speed running, deformation of the tread portion into a round shape is suppressed, and the rolling resistance during high-speed running is also improved. In addition, it is considered that by suppressing the growth of the outer diameter, the tread portion is suppressed from becoming weak, and the resistance to damage in the tread portion is enhanced.

[(V+1.5×10$^7$)/Wt] is further preferably 2.87×10$^5$ or less, further preferably 2.86×10$^5$ or less, further preferably 2.79×10$^5$ or less, further preferably 2.60×10$^5$ or less, further preferably 2.58×10$^5$ or less, further preferably 2.54×10$^5$ or less, further preferably 2.50×10$^5$ or less, further preferably 2.47×10$^5$ or less, further preferably 2.42×10$^5$ or less, further preferably 2.26×10$^5$ or less, further preferably 2.25×10$^5$ or less, further preferably 2.24×10$^5$ or less, further preferably 2.21×10$^5$ or less, further preferably 2.20×10$^5$ or less, further preferably 2.19×10$^5$ or less, further preferably 2.18×10$^5$ or less, and further preferably 2.16×10$^5$ or less.

At this time, it is more preferable that [(V+2.0×10$^7$)/Wt]≤2.88×10$^5$ (Formula 3), and further preferable that [(V+2.5×10$^7$)/Wt]≤2.88×10$^5$ (Formula 4).

The above [(V+2.0×10$^7$)/Wt] is further preferably 2.83×10$^5$ or less, further preferably 2.79×10$^5$ or less, further preferably 2.77×10$^5$ or less, further preferably 2.75×10$^5$ or less, further preferably 2.64×10$^5$ or less, further preferably 2.47×10$^5$ or less, further preferably 2.46×10$^5$ or less, further preferably 2.45×10$^5$ or less, and further preferably 2.44×10$^5$ or less.

Further, [(V+2.5×10$^7$)/Wt] is further preferably 2.86×10$^5$ or less, further preferably 2.75×10$^5$ or less, further preferably 2.74×10$^5$ or less, further preferably 2.73×10$^5$ or less, further preferably 2.71×10$^5$ or less, further preferably 2.70×10$^5$ or less, further preferably 2.69×10$^5$ or less, and further preferably 2.68×10$^5$ or less.

(2) Rubber Composition Forming a Tread Portion

In the present disclosure, at least one of the rubber layers forming the tread portion is made of a rubber composition which contains isoprene-based rubber, styrene-butadiene rubber and butadiene rubber as rubber components. As a result, any one of the three rubber layers can be formed into an island phase microstructure, and it is considered that the input inside the tread can be alleviated.

Further, in the rubber composition of the tread portion, carbon black is contained in an amount of more than 5 parts by mass and 25 parts by mass or less with respect to 100 parts by mass of the rubber component, which is ¼ or less of the rubber component. As a result, it is possible to prevent the carbons in the rubber layer from forming a three-dimensional network, and the input can be alleviated, similar to the island phase, while at the same time sufficient reinforcement can be obtained.

As a result, it is considered that both rolling resistance and chipping resistance on rough road surfaces can be achieved without deteriorating heat generation.

[2] More Preferable Embodiment of the Tire According to the Present Disclosure

The tire according to the present disclosure can obtain a larger effect by taking the following embodiment.

1. Aspect Ratio

The tire according to the present disclosure is preferably a tire having an aspect ratio of 40% or more, whereby it is thought to reduce slippage on rough road surfaces because the contact area increases due to deflection when the tire touches the ground. In addition, by reducing the contribution of heat generation in the tread portion, the deformation of the tire can be made uniform over the entire tire, and the total heat generation of the tire can be sufficiently reduced. As a result, the rolling resistance during high-speed running can be further reduced.

The aspect ratio (%) described above can be obtained by the following formula using the cross-sectional height Ht (mm) and the cross-sectional width Wt (mm) of the tire when the internal pressure is 250 kPa.

$(Ht/Wt) \times 100$ (%)

The aspect ratio is more preferably 44% or more, further preferably 45% or more, further preferably 47.5% or more, further preferably 48% or more, further preferably 49% or more, further preferably 50% or more, further preferably 52.5% or more, further preferably 55% or more, further preferably 57% or more, and further preferably 59% or more. There is no particular upper limit, but for example, it is 100% or less.

2. Relationship Between Carbon Black Content and Cross-Sectional Width

As the cross-sectional width Wt becomes smaller, the force per unit area applied to the tread portion during rolling becomes larger, and chipping may easily occur. Then, the present discloser considered that, if the compounding amount of carbon black is increased in accordance with the size of the cross-sectional width Wt, and the product of the cross-sectional width Wt and the compounding amount of carbon black is maintained at a certain level or more, the reinforcing property at the tread portion is enhanced according to the cross-sectional width Wt, and the chipping resistance is improved. As a result of examination regarding the relation of the compounding amount of carbon black CB (part by mass) and the tire cross-sectional width Wt, it was found that if $CB \times Wt \geq 900$ (formula 5) is satisfied, the chipping resistance can be controlled according to the width.

The above $CB \times Wt$ is more preferably 1056 or more, further preferably 1062 or more, further preferably 1098 or more, further preferably 1176 or more, further preferably 1200 or more, further preferably 1212 or more, further preferably 1362 or more, further preferably 1368 or more, further preferably 1374 or more, further preferably 1456 or more, further preferably 1500 or more, further preferably 1608 or more, further preferably 1800 or more, further preferably 2655 or more, further preferably 2985 or more, further preferably 3465 or more, further preferably 4425 or more, further preferably 4950 or more, and further preferably 5650 or more.

3. Tread Groove

The tire according to the present disclosure has a circumferential groove continuously extending in the tire circumferential direction in the tread portion. The ratio of the groove width $L_{80}$ at a depth of 80% of the maximum depth of the circumferential groove to the groove width $L_0$ of the circumferential groove on the ground contact surface of the tread portion ($L_{80}/L_0$) is preferably 0.3 to 0.7. As a result, it is possible to suppress the movement of the entire land portion on the bottom surface of the land portion of the tread portion, so it is considered that the occurrence of chipping in the tread portion can be suppressed. The ratio is more preferably 0.35 to 0.65, further preferably 0.40 to 0.60, and particularly preferably 0.45 to 0.55. The circumferential grooves may be grooves extending continuously in the tire circumferential direction, and non-linear grooves such as zigzag grooves and wavy grooves are also included in the circumferential grooves.

The above-mentioned $L_0$ and $L_{80}$ refer to the linear distance ($L_0$) between the groove edges on the tread surface of the tread circumferential groove of a tire, and to the minimum distance ($L_{80}$) between the groove walls at a position where the groove depth is 80%, respectively, in a state where the tire is installed on a standardized rim, the internal pressure is 250 kPa, and no load is applied. To put it simply, they can be obtained by putting the bead portion of the section cut out in the radial direction with a width of 2 to 4 cm in a pressed state according to the rim width.

It is preferable that the tread portion has a plurality of circumferential grooves, and the total cross-sectional area of the plurality of circumferential grooves is 10 to 30% of the cross-sectional area of the tread portion. It is considered that this makes it possible to suppress the movement of the tread portion, and suppresses the occurrence of chipping in the tread portion. It is more preferably 15 to 27%, further preferably 18 to 25%, and particularly preferably 21 to 23%.

The cross-sectional area of the circumferential groove refers to the total value of the area composed of a straight line connecting the ends of the tread circumferential groove and a groove wall in a tire installed on a standardized rim, having an internal pressure of 250 kPa and in a no-load state. To put it simply, they can be obtained by putting the bead portion of the section cut out in the radial direction with a width of 2 to 4 cm in a pressed state according to the rim width.

Further, it is preferable that the tread portion has a plurality of lateral grooves extending in the tire axial direction, and the total volume of the plurality of lateral grooves is 2.0 to 5.0% of the volume of the tread portion. It is considered that this makes it possible to suppress the movement of the tread portion, and suppress the occurrence of chipping in the tread portion. It is more preferably 2.2 to 4.0%, further preferably 2.5 to 3.5%, and particularly preferably 2.7 to 3.0%.

The volume of the lateral groove described above refers to the total volume of the volume composed of the surface connecting the ends of the lateral groove and the groove wall in a tire installed on a standardized rim, having an internal pressure of 250 kPa and in a no-load state. To put it simply, it can be obtained by calculating the volume of each lateral groove and multiplying it by the number of grooves, in a state where the bead portion of the section cut out in the radial direction with a width of 2 to 4 cm is pressed down according to the rim width. Further, the volume of the tread portion can be calculated by calculating the area of the portion excluding the lateral groove from the section and multiplying it by the outer diameter, then obtaining the difference between the calculation result and the volume of the lateral groove.

In order to suppress the occurrence of chipping in the tread portion and further improve the durability, it is preferred that at least one of these lateral grooves has a groove width ratio (Gw/Gd), i.e. ratio of groove width Gw to groove depth Gd, of 0.50 to 0.80. The ratio is more preferably 0.53 to 0.77, further preferably 0.55 to 0.75, and particularly preferably 0.60 to 0.70.

The groove width and groove depth of the lateral groove described above refer to the maximum length of the straight lines connecting the tread surface ends of the lateral groove, which are perpendicular to the groove direction, and to the maximum depth of the lateral groove, respectively, in the tire in a state where the internal pressure is 250 kPa and no load is applied. To put it simply, it can be calculated in a state where the bead portion of the section cut out in the radial direction with a width of 2 to 4 cm is put down in a pressed state according to the rim width.

4. Tire Shape

In the tire according to the present disclosure, when the tire is installed on a standardized rim and the internal pressure is 250 kPa, the specific outer diameter Dt (mm) is preferably, for example, 515 mm or more, more preferably 558 mm or more, further preferably 585 mm or more, further preferably 649 mm or more, further preferably 658 mm or more, further preferably 663 mm or more, further preferably 664 mm or more, further preferably 665 mm or more, further preferably 672 mm or more, and most preferably 673 mm or more.

On the other hand, it is preferably less than 843 mm, more preferably 734 mm or less, further preferably less than 725 mm, further preferably 718 mm or less, further preferably 717 mm or less, further preferably 716 mm or less, further preferably 713 mm or less, further preferably 710 mm or less, further preferably less than 707 mm, further preferably 693 mm or less, further preferably 691 mm or less, further preferably less than 685 mm, further preferably 684 mm or less, further preferably 680 mm or less, further preferably 679 mm or less, and further preferably 674 mm or less.

The specific cross-sectional width Wt (mm) is preferably 115 mm or more, more preferably 130 mm or more, further preferably 150 mm or more, further preferably 170 mm or more, still more preferably 176 mm or more, still more preferably 177 mm or more, still more preferably 182 mm or more, still more preferably 183 mm or more, and even more preferably 185 mm, and most preferably 193 mm or more.

On the other hand, it is preferably less than 305 mm, more preferably less than 245 mm, further preferably 231 mm or less, further preferably 229 mm or less, further preferably 228 mm or less, further preferably 227 mm or less, further preferably 226 mm or less, further preferably 225 mm or less, further preferably less than 210 mm, further preferably less than 205 mm, further preferably 202 mm or less, further preferably 201 mm or less, further preferably 200 mm or less, further preferably less than 200 mm, further preferably 199 mm or less, further preferably 198 mm or less, and further preferably 196 mm or less.

The specific cross-sectional height Ht (mm) is, for example, preferably 37 mm or more, more preferably 69 mm or more, further preferably 70 mm or more, further preferably 78 mm or more, further preferably 79 mm or more, further preferably 80 mm or more, further preferably 87 mm or more, further preferably 88 mm or more, further preferably 90 mm or more, further preferably 95 mm or more, further preferably 96 mm or more, further preferably 98 mm or more, and further preferably 99 mm or more.

On the other hand, it is preferably less than 180 mm, more preferably 117 mm or less, further preferably 113 mm or less, further preferably less than 112 mm, further preferably 105 mm or less, further preferably 101 mm or less, and further preferably less than 101 mm.

The specific virtual volume V is preferably 13,000,000 mm3 or more, more preferably 23,005,355 mm$^3$ or more, further preferably 23,471,373 mm$^3$ or more, further preferably 23,510,297 mm$^3$ or more, further preferably 28,431,992 mm$^3$ or more, further preferably 28,526,824 mm$^3$ or more, further preferably 29,000,000 mm$^3$ or more, further preferably 29,087,378 mm$^3$ or more, further preferably 30,152,956 mm$^3$ or more, further preferably 30,354,118 mm$^3$ or more, further preferably 34,331,262 mm$^3$ or more, further preferably 35,417,448 mm$^3$ or more, further preferably 35,785,417 mm$^3$ or more, further preferably 36,000,000 mm$^3$ or more, further preferably 36,015,050 mm$^3$ or more, further preferably 36,203,610 mm$^3$ or more, and further preferably 37,040,131 mm$^3$ or more.

On the other hand, it is preferably less than 66,000,000 mm$^3$, more preferably 50,043,281 mm$^3$ or less, further preferably less than 44,000,000 mm$^3$, further preferably 43,478,150 mm$^3$ or less, further preferably 42,618,582 mm$^3$ or less, further preferably 40,161,995 mm$^3$ or less, and further preferably less than 38,800,000 mm$^3$.

Further, in the present disclosure, considering the stability of the riding comfort during traveling, (Dt−2×Ht) is preferably 450 mm or more, more preferably 457 mm or more, further preferably 470 mm or more, further preferably 480 mm or more, further preferably 482 mm or more, and further preferably 483 mm or more.

On the other hand, considering the deformation of the tread portion, it is preferably less than 560 mm, more preferably 559 mm or less, further preferably 558 mm or less, further preferably 534 mm or less, further preferably 533 mm or less, further preferably less than 530 mm, further preferably less than 510 mm, further preferably 508 mm or less, and further preferably 507 mm or less.

5. Loss Tangent

In addition, in the tire according to the present disclosure, the loss tangent (30° C. tan δ) of the rubber layer of the tread portion measured under the conditions of 30° C., frequency of 10 Hz, initial strain of 5%, and dynamic strain rate of 1% is preferably less than 0.150, more preferably 0.147 or less. As a result, heat generation in the tread portion can be reduced, and a remarkable effect can be exhibited in reducing rolling resistance during high-speed running.

This 30° C. tan δ preferably satisfies (30° C. tan δ/Td)× 100≥2.00 (formula 7), where Td (mm) is the thickness of the rubber layer of the tread layer in the radial direction of the tire. Satisfying (30° C. tan δ/Td)×100≥2.50 (formula 8) is more preferable, and satisfying (30° C. tan δ/Td)×100≥3.00 (formula 9) is further preferable.

More specifically, (30° C. tan δ/Td)×100 is more preferably 2.24 or more, further preferably 2.41 or more, further preferably 2.47 or more, further preferably 2.50 or more, further preferably 2.53 or more, further preferably 2.63 or more, further preferably 2.68 or more, further preferably 3.11 or more, further preferably 3.15 or more, further preferably 3.16 or more, further preferably 3.27 or more, further preferably 3.74 or more, further preferably 3.75 or more, and further preferably 4.30 or more.

By maintaining 30° C. tan δ with respect to the tread thickness Td at a certain value or more in this manner, the input from the road surface at the tread portion can be alleviated, so that the chipping resistance can be improved.

Measurement of the above-mentioned 30° C. tan δ is performed on the rubber cut out from the radial outside of the groove bottom of the tire at least, preferably from the radial outside of the half depth of the deepest circumferential groove. Specifically, the measurement is performed using, for example, a viscoelasticity measuring device of "Eplexor (registered trademark)" manufactured by GABO.

When the tread portion is formed of a plurality of rubber layers, this rubber composition may be used as the cap rubber layer when the innermost layer is the base rubber layer and the other layers are the cap rubber layer. Among the cap rubber layers, it is particularly preferable to use it for the outermost rubber layer.

[3] Embodiment

Hereinafter, the present disclosure will be specifically described based on the embodiments.

1. Rubber Composition Forming the Tread Portion

The rubber composition forming the tread portion of the tire according to the present disclosure can be obtained by appropriately adjusting the type and amount of various compounding materials such as rubber components, fillers, softeners, vulcanizing agents and vulcanization accelerators described below.

(1) Rubber Component

In the present embodiment, the rubber component contains isoprene-based rubber, styrene-butadiene rubber (SBR), and butadiene rubber (BR), and nitrile rubber (NBR) can be used. By making the rubber component a three-component system in this way, it is possible to form a microstructure in which any one of the three rubber phases is an island phase, as described above.

(b) Isoprene Rubber

The content (total content) of the isoprene-based rubber in 100 parts by mass of the rubber component is preferably more than 5 parts by mass, and 7.5 parts by mass, from the viewpoint of obtaining good low heat generation and durability during high-speed running. On the other hand, from the viewpoint of wet grip performance, it is preferably less than 20 parts by mass, more preferably less than 15 parts by mass. The isoprene rubber includes natural rubber (NR), isoprene rubber (IR), reformed NR, modified NR, modified IR, and the like.

As the NR, for example, SIR20, RSS #3, TSR20 and the like, which are common in the tire industry, can be used. The IR is not particularly limited, and for example, IR 2200 and the like, which are common in the tire industry, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR includes epoxidized isoprene rubber, hydrogenated isoprene rubber, grafted isoprene rubber, and the like. These may be used alone or in combination of two or more.

(a) SBR

The content of SBR in 100 parts by mass of the rubber component is, for example, preferably more than 30 parts by mass, and more preferably more than 35 parts by mass from the viewpoint of wet grip performance. On the other hand, it is preferably less than 55 parts by mass, and more preferably 50 parts by mass or less, from the viewpoint of heat generation during high-speed running. The weight average molecular weight of SBR is, for example, more than 100,000 and less than 2 million. The styrene content of SBR is, for example, preferably more than 5% by mass, more preferably more than 10% by mass, and even more preferably more than 20% by mass, from the viewpoint of obtaining good wet grip performance. On the other hand, from the viewpoint of heat generation and durability during high-speed running, it is preferably less than 50% by mass, more preferably less than 40% by mass, and even more preferably less than 35% by mass. The vinyl bond amount (1,2-bonded butadiene unit amount) of SBR is, for example, more than 5% by mass and less than 70% by mass. The structure identification of SBR (measurement of styrene content and vinyl bond amount) can be performed using, for example, an apparatus of the JNM-ECA series manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR.

The modified SBR may be any SBR having a functional group that interacts with a filler such as silica. Examples thereof include end-modified SBR (end-modified SBR having the above functional group at the terminal) in which at least one end of the SBR is modified with a compound having the above functional group (modifying agent), main chain modified SBR having the functional group in the main chain, main chain terminal modified SBR having the functional group at the main chain and the terminal (for example, a main chain terminal modified SBR having the above functional group to the main chain and having at least one end modified with the above modifying agent), and end-modified SBR which is modified (coupled) with a polyfunctional compound having two or more epoxy groups in the molecule, and into which an epoxy group or hydroxyl group has been introduced, Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

Further, as the modified SBR, for example, an SBR modified with a compound (modifying agent) represented by the following formula can be used.

[Chemical 1]

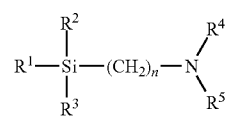

In the above formula, $R^1$, $R^2$ and $R^3$ represent, the same or different, alkyl group, alkoxy group, silyloxy group, acetal group, carboxyl group (—COOH), mercapto group (—SH) or derivatives thereof. $R^4$ and $R^5$ represent, the same or different, hydrogen atoms or alkyl groups. $R^4$ and $R^5$ may be combined to form a ring structure with nitrogen atoms. n represents an integer.

As the modified SBR modified with the compound represented by the above formula (modifying agent), a solution-polymerized styrene-butadiene rubber (S-SBR) in which the polymerization terminal (active terminal) is modified with the compound represented by the above formula (such as modified SBR described in JP-A-2010-111753) can be used.

As $R^1$, $R^2$ and $R^3$, an alkoxy group is preferable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is preferable. n is preferably 1 to 5, more preferably 2 to 4, and even more preferably 3. Further, when $R^4$ and $R^5$ are bonded to form a ring structure together with a nitrogen atom, a 4- to 8-membered ring is preferable. The alkoxy group also includes a cycloalkoxy group (for example, cyclohexyloxy group) and an aryloxy group (for example, phenoxy group, benzyloxy group).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N, N'-diglycidyl-4-glycidyloxyaniline, diglycidyl ortho-toluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N, N-bis (trimethylsilyl)-3-aminopropyltrimethoxysilane, N, N-bis (trimethylsilyl)-3-aminopropyltriethoxysilane, N, N-bis (trimethylsilyl) aminoethyltrimethoxysilane, and N, N-bis (trimethylsilyl) aminoethyltriethoxysilane;

(thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis (dimethylamino) benzophenone, 4,4'-bis (diethylamino) benzophenone, 4,4'-bis (diphenylamino) benzophenone, and N, N, N', N'-bis-(tetraethylamino) benzophenone;

benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;

N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and N, N-bis-(2,3-epoxypropoxy)-aniline, 4,4-methylene-bis-(N, N-glycidylaniline), tris-(2,3-epoxypropyl)-1,3,5-triazine-2,4,6-triones, N, N-diethylacetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis (diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., JSR Corporation, Asahi Kasei Co., Ltd., Nippon Zeon Corporation, etc. can be used. The SBR may be used alone or in combination of two or more.

(c) BR

The content of BR in 100 parts by mass of the rubber component is, for example, preferably more than 35 parts by mass, and more preferably 40 parts by mass or more, from the viewpoint of wear resistance. On the other hand, from the viewpoint of rolling resistance during high-speed running, the content is preferably less than 55 parts by mass, and more preferably less than 50 parts by mass. The weight average molecular weight of BR is, for example, more than 100,000 and less than 2,000,000. The vinyl bond amount of BR is, for example, more than 1% by mass and less than 30% by mass. The cis content of BR is, for example, more than 1% by mass and less than 98% by mass. The trans amount of BR is, for example, more than 1% by mass and less than 60% by mass.

BR is not particularly limited, and BR with high cis content (90% or more of cis content), BR with low cis content, BR containing syndiotactic polybutathene crystals, and the like can be used. BR may be either non-modified BR or modified BR, and modified BR includes modified BR into which the above functional groups have been introduced. These may be used alone or in combination of two or more. The cis content can be measured by infrared absorption spectrometry.

As BR, for example, products of Ube Industries, Ltd., JSR Corporation, Asahi Kasei Co., Ltd., Nippon Zeon Co., Ltd., etc. can be used.

(d) Other Rubber Components

Further, as another rubber component, the rubber composition may contain a rubber (polymer) generally used in the production of tires, such as nitrile rubber (NBR).

(2) Compounding Materials Other than Rubber Components (a) Filler

In the present embodiment, the rubber composition preferably contains a filler. A specific filler in the present embodiment is carbon black, and if necessary, it may contain silica, graphite, calcium carbonate, talc, alumina, clay, aluminum hydroxide, mica, and the like. When using silica, it is preferable to use together with a silane coupling agent.

(a-1) Carbon Black

In the present embodiment, the rubber composition contains more than 5 parts by mass and 25 parts by mass or less of carbon black with respect to 100 parts by mass of the rubber component. The content of carbon black is more preferably 6 parts by mass or more, more preferably more than 10 parts by mass, and even more preferably 15 parts by mass or more. As a result, as described above, the carbons in the rubber layer are prevented from forming a three-dimensional network, and the input applied to the tread portion is alleviated in the same manner as the island phase formed by the rubber component, while sufficient reinforcement can be obtained.

Nitrogen adsorption specific surface area ($N_2SA$) of carbon black is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The carbon black is not particularly limited, and examples thereof includes furnace black (furnace carbon black) such as SAF, ISAF, HAF, MAF, FEF, SRF, GPF, APF, FF, CF, SCF and ECF; acetylene black (acetylene carbon black); thermal black (thermal carbon black) such as FT and MT; and channel black (channel carbon black) such as EPC, MPC and CC. These may be used alone or in combination of two or more.

The specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(a-2) Silica

The rubber composition preferably contains silica, if necessary. The BET specific surface area of the silica is preferably more than 140 $m^2/g$, and more preferably more than 160 $m^2/g$, from the viewpoint of obtaining good durability performance. On the other hand, from the viewpoint of obtaining good rolling resistance at high-speed running, it is preferably less than 250 $m^2/g$, and more preferably less than 220 $m^2/g$. In addition, the content of the silica with respect to 100 parts by mass of the rubber component is preferably more than 35 parts by mass, more preferably more than 40 parts by mass, further preferably more than 45 parts by mass, further preferably 47 parts by mass or more, and further preferably 49 parts by mass or more, from the viewpoint of obtaining good durability performance. On the other hand, from the viewpoint of obtaining good rolling resistance during high-speed running, it is preferably less than 85 parts by mass, more preferably 84 parts by mass or less, further preferably 82 parts by mass or less, further preferably 69 parts by mass or less, and further preferably 67 parts by mass. The above-mentioned BET specific surface area is the value of $N_2SA$ measured by the BET method according to ASTM D3037-93.

Examples of silica include dry silica (anhydrous silica) and wet silica (hydrous silica). Among them, wet silica is preferable because it has large number of silanol groups.

As the silica, for example, products of Degussa, Rhodia, Tosoh Silica Co., Ltd., Solvay Japan Co., Ltd., Tokuyama Corporation, etc. can be used.

(a-3) Silane Coupling Agent

The rubber composition preferably contains a silane coupling agent together with silica. The silane coupling agent is not particularly limited. Examples of the silane coupling agent include sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl) disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylatemonosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass, and more preferably 10 parts by mass or more, with respect to 100 parts by mass of silica.

(a-4) Other Fillers

The rubber composition may further contain fillers such as graphite, calcium carbonate, talc, alumina, clay, aluminum hydroxide, and mica, which are generally used in the tire industry, in addition to the above-mentioned carbon black and silica. These contents are, for example, more than 0.1 part by mass and less than 200 parts by mass with respect to 100 parts by mass of the rubber component.

(b) Softener

The rubber composition may contain oil (including extender oil), liquid rubber, or the like, as a softener. The total content of these is preferably more than 10 parts by mass, more preferably more than 20 parts by mass further preferably more than 25 parts by mass with respect to 100 parts by mass of the rubber component. On the other hand, less than 50 parts by mass is preferable, less than 40 parts by mass is more preferable, and less than 35 parts by mass is further preferable. The oil content also includes the amount of oil contained in oil spread rubber.

Examples of the oil include mineral oil (generally referred to as process oil), vegetable oil and fat, or a mixture thereof. As the mineral oil (process oil), for example, a paraffinic process oil, an aroma-based process oil, a naphthene procediamNOCss oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni flower oil, sesame oil, olive oil, sunflower oil, palm kernel oil, camellia oil, jojoba oil, macadamia nut oil, and tung oil. These may be used alone or in combination of two or more.

Examples of process oil (mineral oil) include products of Idemitsu Kosan Co., Ltd., Sankyo Yuka Kogyo Co., Ltd., Japan Energy Co., Ltd., Olisoy Co., Ltd., H & R Co., Ltd., Toyokuni Seiyu Co., Ltd., Showa Shell Sekiyu Co., Ltd., and Fuji Kosan Co., Ltd.

The liquid rubber mentioned as the softener is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E, 7E)-3,7,11-trimethyl-1,3,6,10-dodecatetraene) and β-farnesene (7,11-dimethyl-3-methylene-1,6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-equivalent weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

As the liquid rubber, for example, products of Kuraray Co., Ltd. and Clay Valley Co., Ltd. can be used.

(c) Resin Component

Further, the rubber composition preferably contains a resin component. The resin component may be solid or liquid at room temperature, and specific resin components include styrene resin, coumarone resin, terpene resin, C5 resin, C9 resin, C5C9 resin, acrylic resin, and the like. Two or more kinds of the resin component may be used in combination. The content of the resin component is preferably more than 2 parts by mass, more preferably 5 parts by mass or more, with respect to 100 parts by mass of the rubber component. On the other hand, it is preferably less than 10 parts by mass, and more preferably less than 6 parts by mass.

The styrene resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; α,β-unsaturated carboxylic acids such as maleic anhydride; and acid anhydrides thereof.

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$, or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, β-pinene, dipentene, limonene, myrcene, alloocimene, osimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, β-pinene resin, limonene resin, dipentene resin, and βpinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and the formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone, and indene.

The C5 resin refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The C9 resin refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Clayton, Eastman Chemical, etc. can be used.

The C5C9 resin refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method: a method described in U.S. Pat. No. 4,414,370 B, JP 84-6207 A, JP 93-58805 A, JP 89-313522 A, U.S. Pat. No. 5,010,166 B, Toa Synthetic Research Annual Report TREND2000 No. 3 p42-45, and the like) without using polymerization initiators, chain transfer agents, organic solvents, etc. as auxiliary raw materials as much as possible, can be mentioned. In the present disclosure, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., JX Energy Co., Ltd., Arakawa Chemical Industry Co., Ltd., Taoka Chemical Industry Co., Ltd. can be used.

(d) Anti-Aging Agent

The rubber composition preferably contains an anti-aging agent. Content of the anti-aging agent is, for example, more than 1 part by mass and less than 10 parts by mass, and more preferably 3 parts by mass or more, with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α, α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(e) Stearic Acid

The rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, NOF Corporation, Kao Corporation, Fuji film Wako Pure Chemical Industries, Ltd., and Chiba Fatty Acid Co., Ltd., etc. can be used.

(f) Zinc Oxide

The rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(g) Wax

The rubber composition preferably contains wax. Content of the wax is, for example, 0.5 to 20 parts by mass, preferably 1.0 to 15 parts by mass, and more preferably 1.5 to 10.0 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer of ethylene or propylene. These may be used alone or in combination of two or more.

As the wax, for example, products of Ouchi Shinko Chemical Industry Co., Ltd., Nippon Seiro Co., Ltd., and Seiko Kagaku Co., Ltd. can be used.

(h) Crosslinking Agent and Vulcanization Accelerator

The rubber composition preferably contains a cross-linking agent such as sulfur. Content of the cross-linking agent is, for example, more than 0.1 part by mass and less than 10.0 parts by mass, and more preferably 1.5 parts by mass or more, with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexamethylene-sodium dithiosulfate dihydrate) manufactured by Flexsys, and KA9188 (1,6-bis (N, N'-dibenzylthiocarbamoyldithio) hexane) manufactured by Lanxess; and organic peroxides such as dicumylperoxide.

The rubber composition preferably contains a vulcanization accelerator. Content of the vulcanization accelerator is, for example, more than 0.3 parts by mass and less than 10.0 parts by mass, and more preferably 3 parts by mass or more, with respect to 100 parts by mass of the rubber component.

Examples of the vulcanization accelerator include
thiazole-based vulcanization accelerators such as 2-mercaptobenzothiazole, di-2-benzothiazolyl disulfide, and N-cyclohexyl-2-benzothiadylsulfenamide;
thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);
sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N, N'-diisopropyl-2-benzothiazolesulfenamide; and guanidine-based vulcanization accelerators such as diphenylguanidine, di-ortho-tolylguanidine, and ortho-tolylbiguanidine. These may be used alone or in combination of two or more.

(i) Other

In addition to the above components, the rubber composition may further contain additives generally used in the tire industry, such as fatty acid metal salts, carboxylic acid metal salts, and organic peroxides. Content of these additives is, for example, more than 0.1 part by mass and less than 200 parts by mass with respect to 100 parts by mass of the rubber component.

2. Production of Tread Rubber Composition

The rubber composition is produced by a general method, for example, a manufacturing method including a base kneading step of kneading a rubber component with a filler such as silica or carbon black, and a finish kneading step of kneading the kneaded product obtained in the base kneading step and a cross-linking agent.

The kneading can be performed using a known (sealed) kneader such as a banbury mixer, a kneader, or an open roll.

The kneading temperature of the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature of the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

3. Tire Manufacturing

The tire of the present disclosure is manufactured by a usual method using an unvulcanized rubber composition obtained through the finish kneading step. That is, the unvulcanized rubber composition is extruded according to the shape of tread, and is molded together with other tire members by a normal method on a tire molding machine to produce an unvulcanized tire.

Specifically, on the molded drum, the inner liner as a member to ensure the air-tightness of the tire, the carcass as a member to withstand the load and impact received by the tire, and filling air pressure, a belt as a member to strongly tighten the carcass to increase the rigidity of the tread, and the like are wound, both ends of the carcass are fixed to both side edges, a bead part as a member for fixing the tire to the rim is arranged, and they are formed into a toroid shape. Then the tread is pasted on the center of the outer circumference, and the sidewall portion as a member that protects the carcass and resists bending is pasted on the radial outer side to produce an unvulcanized tire.

In the present embodiment, it is preferable to provide with an inclined belt layer that extends at an angle of 15° to 30° with respect to the tire circumferential direction, as the belt. As a result, the durability of the tire is ensured while the rigidity of the tread can be sufficiently maintained. Further, since it can be restrained in the circumferential direction, it becomes easy to suppress the growth of the outer diameter.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes and less than 15 minutes.

At this time, the tire is formed into a shape that satisfies the above-mentioned (formula 1) and (formula 2), when the tire is installed on a standardized rim and the internal pressure is set to the standardized internal pressure.

Specific tires that can satisfy the above (formula 1) and (formula 2) include tires with size notation of 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, 195/55R20, etc.

In the present embodiment, the tires that can satisfy (formula 1) and (formula 2) are preferably applied to pneumatic tires for passenger cars, and satisfying the above formulas can contribute more favorably to solve the problem in the present disclosure of providing a pneumatic tire in which the rolling resistance at high-speed running is sufficiently reduced, and the chipping resistance is sufficiently improved.

EXAMPLES

Hereinafter, the present disclosure will be described in more specific with reference to Examples.

Experiment 1

In this experiment, 175 size tires were prepared and evaluated.

1. Manufacture of Rubber Compositions for Treads
   First, a rubber composition for tread was produced.
   (1) Compounding Material
   First, each compounding material shown below was prepared.
   (a) Rubber Component
   - (a-1) NR: TSR20
   - (a-2) SBR: Modified solution polymerization SBR produced according to the method described in the next paragraph. (Styrene content: 30% by mass, vinyl bond amount: 52% by mass, Mw: 250,000)
   - (a-3) BR-1: UBEPOL-BR360B manufactured by Ube Kosan Co., Ltd. (cis content: 98% by mass)
   - (a-4) BR-2: N103 manufactured by Asahi Kasei Chemicals Co., Ltd. (cis content: 35% by mass)

The abovementioned SBR was produced according to the procedure shown below. First, cyclohexane, tetrahydrofuran, styrene, and 1,3-butadiene were charged into a nitrogen-substituted autoclave reactor. After adjusting the temperature of the contents of the reactor to 20° C., n-butyllithium was added to initiate polymerization. Polymerization was carried out under adiabatic conditions, and the maximum temperature reached 85° C. When the polymerization conversion reaches 99%, 1,3-butadiene was added, and then further polymerization was carried out for 5 minutes. Thereafter, N, N-bis (trimethylsilyl)-3-aminopropyltriethoxysilane was added as a modifying agent to carry out the reaction. After completion of the polymerization reaction, 2,6-di-tert-butyl-p-cresol was added. Then, the solvent was removed by steam stripping and dried by a heat roll adjusted to 110° C. to obtain the SBR.

(b) Compounding Materials Other than Rubber Components
   - (b-1) Carbon black: Show Black N134 manufactured by Cabot Japan Co., Ltd. ($N_2SA$: 134 $m^2/g$)
   - (b-2) Silica: Ultrasil VN3 manufactured by Evonik (BET specific surface area: 165 $m^2/g$)
   - (b-3) Silane coupling agent: Si266 (bis (3-triethoxysilylpropyl)disulfide) manufactured by Degussa
   - (b-4) Oil: Process X-140 manufactured by Japan Energy Co., Ltd.
   - (b-5) Resin: SYLVATRAXX 4401 (α-methylstyrene resin) manufactured by Arizona Chemical Co.
   - (b-6) Wax: Ozoace 0355 manufactured by Nippon Seiro Co., Ltd.
   - (b-7) Anti-aging agent-1: Nocrac 6C manufactured by Ouchi Shinko Chemical Industry Co., Ltd. (N-phenyl-N'(1,3-dimethylbutyl)-p-phenylenediamine)
   - (b-8) Anti-aging agent-2: Nocrac 224 manufactured by Ouchi Shinko Chemical Industry Co., Ltd. (2,2,4-trimethyl-1,2-dihydroquinoline polymer)
   - (b-9) Crosslinking agent and vulcanization accelerator
       Sulfur: Powdered sulfur manufactured by Tsurumi Chemical Industry Co., Ltd.
       Vulcanization accelerator-1: Nocceler NS manufactured by Ouchi Shinko Chemical Industry Co., Ltd. (N-tert-butyl-2-benzothiazolylsulfenamide)
       Vulcanization accelerator-2: Nocceler DPG manufactured by Ouchi Shinko Chemical Industry Co., Ltd. (1,3-diphenylguanidine)

(2) Production of Rubber Composition
   In accordance with the formulation shown in Table 1 and Table 2, materials other than sulfur and the vulcanization accelerator were kneaded under the conditions of 150° C. for 5 minutes using a banbury mixer to obtain a kneaded product. Each compounding amount is a part by mass.

2. Tire Manufacturing
   Next, sulfur and a vulcanization accelerator were added to the obtained kneaded product, and the mixture was kneaded at 80° C. for 5 minutes using an open roll to obtain a tread rubber composition. A tread is formed using the obtained tread rubber composition, bonded together with other tire members to form an unvulcanized tire, which is then press-vulcanized for 10 minutes under the condition of 170° C. to produce each test tire having a size of 175 type (Example 1-1 to Example 1-5 and Comparative Example 1-1 to Comparative Example 1-7).

3. Parameter Calculation
   After that, for each test tire, the thickness Td (mm) of the rubber layer of the tread portion, the outer diameter Dt (mm) of the tire, the cross-sectional width Wt (mm), the cross-sectional height Ht (mm), and the aspect ratio (%) were obtained, and, in addition, a virtual volume V ($mm^3$) was obtained.

At the same time, a rubber test piece for viscoelasticity measurement was produced by cutting out from the rubber layer of the tread portion of each test tire in a length 20 mm×width 4 mm×thickness 2 mm so that the tire circumferential direction was the long side. For each rubber test piece, tan δ (30° C. tan δ) was measured under the conditions of 30° C., frequency 10 Hz, initial strain 5%, and dynamic strain 1% using an Eplexor series manufactured by GABO Co., Ltd. Regarding the test tire having the same composition, the average of each measured value was used.

Then, $(Dt-2\times Ht)$, $(Dt^2\times\pi/4)/Wt$, $(V+1.5\times 10^7)/Wt$, $(V+2.0\times 10^7)/Wt$, $(V+2.5\times 10^7)/Wt$, $CB\times Wt$, and $(30°\ C.\ \tan\delta/Td)\times 100$ were determined. The results are shown in Tables 1 and 2.

5. Performance Evaluation Test
   (1) Evaluation of Rolling Resistance at High-Speed Running
   Each test tire was installed on all wheels of the vehicle (domestic FF vehicle, displacement 2000 cc), filled with air so that the internal pressure became 250 kPa, and then driven on the test course on the dry road surface at a speed of 100 km/h. After making a 10 km lap, the accelerator was released, and the distance from when the accelerator was turned off until the vehicle stopped was measured as the rolling resistance at high-speed running.

Next, the result in Comparative Example 1-5 was set to as 100, and the results were indexed based on the following formula to relatively evaluate the rolling resistance at high-speed running. The larger the value, the longer the distance from when the accelerator is turned off until the vehicle stops and the smaller the rolling resistance in the steady state, and showing excellent fuel efficiency.

Rolling resistance=[(Result of test tire)/(Result of Comparative Example 1-5)]×100

(2) Evaluation of Chipping Resistance
   Each test tire is mounted on all wheels of a vehicle (domestic FF vehicle, displacement 2000 cc), filled with air so that the internal pressure became 250 kPa, and then driven on the test course on the dry road surface at a speed of 100 km/h. After making a 10 km lap, it was made to lap the sand course as it was. After completing the lap, the number and size of chipped blocks on the tread portion of the tire were integrated, and the reciprocal number thereof was calculated.

Then, with the calculation result in Comparative Examples 1-7 set to 100, the durability was evaluated relatively by indexing based on the following formula. The larger the numerical value, the smaller the number of chips in the block and smaller the size of chips, indicating that the chipping resistance is excellent.

Chipping resistance=[(calculation result of test tire)/
(calculation result of Comparative Example
1-7)]×100

(3) Comprehensive Evaluation

The evaluation results of (1) and (2) above were totaled to obtain a comprehensive evaluation.

(4) Evaluation Result

The results of each evaluation are shown in Tables 1 and 2.

TABLE 1

|  | Example No. | | | | |
| --- | --- | --- | --- | --- | --- |
|  | 1-1 | 1-2 | 1-3 | 1-4 | 1-5 |
|  | SIZE | | | | |
|  | 175/40R21 | 175/40R21 | 175/40R21 | 175/50R20 | 175/60R19 |
|  | (Formulation) | | | | |
| NR | 10 | 10 | 10 | 10 | 10 |
| SBR | 45 | 45 | 45 | 45 | 45 |
| BR-1 | 35 | 35 | 35 | 35 | 35 |
| BR-2 | 10 | 10 | 10 | 10 | 10 |
| Carbon | 6 | 15 | 25 | 6 | 6 |
| Silica | 49 | 47 | 47 | 49 | 49 |
| Silane coupling agent | 4.9 | 4.7 | 4.7 | 4.9 | 4.9 |
| Oil | 30 | 30 | 30 | 30 | 30 |
| Resin | 5 | 5 | 5 | 5 | 5 |
| Wax | 1.5 | 1.5 | 1.5 | 1.5 | 1.5 |
| Anti-aging agent-1 | 2 | 2 | 2 | 2 | 2 |
| Anti-aging agent-2 | 1 | 1 | 1 | 1 | 1 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
|  | (Parameter) | | | | |
| 30° C. tanδ | 0.158 | 0.177 | 0.217 | 0.147 | 0.147 |
| CB (part by mass) | 6 | 15 | 25 | 6 | 6 |
| Td(mm) | 8.2 | 7.9 | 8.1 | 8.0 | 7.8 |
| Dt(mm) | 672 | 673 | 674 | 684 | 693 |
| V(mm$^3$) | 23005355 | 23471373 | 23510297 | 30152956 | 34331262 |
| Wt(mm) | 176 | 177 | 177 | 183 | 177 |
| Ht(mm) | 69 | 70 | 70 | 88 | 105 |
| Dt-2 × Ht(mm) | 534 | 533 | 534 | 508 | 483 |
| (Dt$^2$ × Π/4)/Wt | 2015 | 2010 | 2016 | 2008 | 2131 |
| (V + 1.5 × 10$^7$)/Wt | 215940 | 217352 | 217572 | 246737 | 278708 |
| (V + 2.0 × 10$^7$)/Wt | 244349 | 245601 | 245821 | 274060 | 306956 |
| (V + 2.5 × 10$^7$)/Wt | 272758 | 273850 | 274069 | 301382 | 335205 |
| Aspect ratio (%) | 39.20 | 39.55 | 39.55 | 48.09 | 59.32 |
| CB × Wt | 1056 | 2655 | 4425 | 1098 | 1062 |
| (30° C. tanδ/Td) × 100 | 1.93 | 2.24 | 2.68 | 1.84 | 1.88 |
|  | (Evaluation result) | | | | |
| Rolling resistance at high-speed running | 110 | 108 | 106 | 112 | 115 |
| Chipping resistance | 118 | 126 | 135 | 115 | 108 |
| Comprehensive evaluation | 228 | 234 | 241 | 227 | 223 |

TABLE 2

|  | Comparative example No. | | | | | | |
| --- | --- | --- | --- | --- | --- | --- | --- |
|  | 1-1 | 1-2 | 1-3 | 1-4 | 1-5 | 1-6 | 1-7 |
|  | SIZE | | | | | | |
|  | 175/80R14 | 175/60R19 | 175/80R14 | 175/80R14 | 175/80R14 | 175/80R14 | 175/80R14 |
|  | (Formulation) | | | | | | |
| NR |  |  |  | 10 | 55 | 10 | 10 |
| SBR | 55 | 55 | 55 | 45 |  | 45 | 45 |
| BR-1 | 35 | 35 | 35 | 35 | 35 | 35 | 35 |
| BR-2 | 10 | 10 | 10 | 10 | 10 | 10 | 10 |
| Carbon | 3 | 3 | 6 | 3 | 3 | 15 | 25 |
| Silica | 52 | 52 | 49 | 52 | 52 | 40 | 47 |

TABLE 2-continued

| | Comparative example No. | | | | | | |
|---|---|---|---|---|---|---|---|
| | 1-1 | 1-2 | 1-3 | 1-4 | 1-5 | 1-6 | 1-7 |
| | | | | SIZE | | | |
| | 175/80R14 | 175/60R19 | 175/80R14 | 175/80R14 | 175/80R14 | 175/80R14 | 175/80R14 |
| Silane coupling agent | 5.2 | 5.2 | 4.9 | 5.2 | 5.2 | 4 | 4.7 |
| Oil | 30 | 30 | 30 | 30 | 30 | 30 | 30 |
| Resin | 5 | 5 | 5 | 5 | 5 | 5 | 5 |
| Wax | 1.5 | 1.5 | 1.5 | 1.5 | 1.5 | 1.5 | 1.5 |
| Anti-aging agent-1 | 2 | 2 | 2 | 2 | 2 | 2 | 2 |
| Anti-aging agent-2 | 1 | 1 | 1 | 1 | 1 | 1 | 1 |
| Sulfur | 1.5 | 1.5 | 1.5 | 1.5 | 1.5 | 1.5 | 1.5 |
| Vulcanization accelerator-1 | 2 | 2 | 2 | 2 | 2 | 2 | 2 |
| Vulcanization accelerator-2 | 1 | 1 | 1 | 1 | 1 | 1 | 1 |
| (Parameter) | | | | | | | |
| 30° C.tanδ | 0.156 | 0.156 | 0.164 | 0.158 | 0.153 | 0.165 | 0.217 |
| CB (part by mass) | 3 | 3 | 6 | 3 | 3 | 15 | 25 |
| Td(mm) | 7.8 | 8.1 | 7.9 | 8.1 | 8.2 | 7.7 | 7.8 |
| Dt(mm) | 636 | 692 | 693 | 694 | 636 | 635 | 637 |
| V(mm$^3$) | 38394786 | 34466507 | 34331262 | 34854035 | 38612938 | 38099665 | 38669035 |
| Wt(mm) | 176 | 178 | 177 | 178 | 177 | 175 | 176 |
| Ht(mm) | 140 | 105 | 105 | 106 | 140 | 140 | 141 |
| Dt-2 × Ht(mm) | 356 | 482 | 483 | 482 | 356 | 355 | 355 |
| (Dt$^2$ × π/4)/Wt | 1805 | 2113 | 2131 | 2125 | 1795 | 1810 | 1811 |
| (V + 1.5 × 10$^7$)/Wt | 303379 | 277902 | 278708 | 280079 | 302898 | 303427 | 304938 |
| (V + 2.0 × 10$^7$)/Wt | 331789 | 305992 | 306956 | 308169 | 331147 | 331998 | 333347 |
| (V + 2.5 × 10$^7$)/Wt | 360198 | 334082 | 335205 | 336259 | 359395 | 360570 | 361756 |
| Aspect ratio (%) | 79.55 | 58.99 | 59.32 | 59.55 | 79.10 | 80.00 | 80.11 |
| CB × Wt | 528 | 534 | 1062 | 534 | 531 | 2625 | 4400 |
| (30° C.tanδ/Td) × 100 | 2.00 | 1.93 | 2.08 | 1.95 | 1.87 | 2.14 | 2.78 |
| (Evaluation result) | | | | | | | |
| Rolling resistance at high-speed running | 96 | 100 | 94 | 96 | 100 | 96 | 87 |
| Chipping resistance | 92 | 88 | 95 | 96 | 88 | 95 | 100 |
| Comprehensive evaluation | 188 | 188 | 189 | 192 | 188 | 191 | 187 |

Experiment 2

In this experiment, 195 size tires were prepared and evaluated.

After producing the test tires of Examples 2-1 to 2-5 and Comparative Examples 2-1 to 2-7 shown in Tables 3 and 4 in the same manner as in Experiment 1, each parameter was calculated by performing the same procedure. Then, in the same manner, a performance evaluation test was conducted and evaluated. In this experiment, the result in Comparative Example 2-5 was set as 100, when evaluating rolling resistance during high-speed running, and the result in Comparative Example 2-7 was set as 100, when evaluating chipping resistance. The results of each evaluation are shown in Tables 3 and 4.

TABLE 3

| | Example No. | | | | |
|---|---|---|---|---|---|
| | 2-1 | 2-2 | 2-3 | 2-4 | 2-5 |
| | | | SIZE | | |
| | 195/40R20 | 195/40R20 | 195/40R20 | 195/50R19 | 195/60R18 |
| (Formulation) | | | | | |
| NR | 10 | 10 | 10 | 10 | 10 |
| SBR | 45 | 45 | 45 | 45 | 45 |
| BR-1 | 35 | 35 | 35 | 35 | 35 |
| BR-2 | 10 | 10 | 10 | 10 | 10 |
| Carbon | 6 | 15 | 25 | 6 | 6 |
| Silica | 69 | 67 | 67 | 69 | 69 |
| Silane coupling agent | 6.9 | 6.7 | 6.7 | 6.9 | 6.9 |
| Oil | 30 | 30 | 30 | 30 | 30 |
| Resin | 5 | 5 | 5 | 5 | 5 |
| Wax | 1.5 | 1.5 | 1.5 | 1.5 | 1.5 |
| Anti-aging agent-1 | 2 | 2 | 2 | 2 | 2 |
| Anti-aging agent-2 | 1 | 1 | 1 | 1 | 1 |
| Sulfur | 1.5 | 1.5 | 1.5 | 1.5 | 1.5 |

TABLE 3-continued

| | Example No. | | | | |
|---|---|---|---|---|---|
| | 2-1 | 2-2 | 2-3 | 2-4 | 2-5 |
| | | | SIZE | | |
| | 195/40R20 | 195/40R20 | 195/40R20 | 195/50R19 | 195/60R18 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 30° C. tanδ | 0.205 | 0.243 | 0.288 | 0.205 | 0.205 |
| CB (part by mass) | 6 | 15 | 25 | 6 | 6 |
| Td(mm) | 8.3 | 7.7 | 7.7 | 8.2 | 8.1 |
| Dt(mm) | 665 | 663 | 664 | 680 | 691 |
| V(mm$^3$) | 29087378 | 28526824 | 28431992 | 35417448 | 42618582 |
| Wt(mm) | 200 | 199 | 198 | 196 | 202 |
| Ht(mm) | 79 | 78 | 78 | 99 | 117 |
| Dt-2 × Ht(mm) | 507 | 507 | 508 | 482 | 457 |
| (Dt$^2$ × Π/4)/Wt | 1737 | 1735 | 1749 | 1853 | 1856 |
| (V + 1.5 × 10$^7$)/Wt | 220437 | 218728 | 219353 | 257232 | 285241 |
| (V + 2.0 × 10$^7$)/Wt | 245437 | 243853 | 244606 | 282742 | 309993 |
| (V + 2.5 × 10$^7$)/Wt | 270437 | 268979 | 269859 | 308252 | 334745 |
| Aspect ratio (%) | 39.50 | 39.20 | 39.39 | 50.51 | 57.92 |
| CB × Wt | 1200 | 2985 | 4950 | 1176 | 1212 |
| (30° C . tanδ/Td) × 100 | 2.47 | 3.16 | 3.74 | 2.50 | 2.53 |
| (Evaluation result) | | | | | |
| Rolling resistance at high-speed running | 108 | 104 | 100 | 112 | 116 |
| Chipping resistance | 120 | 128 | 138 | 115 | 110 |
| Comprehensive evaluation | 228 | 232 | 238 | 227 | 226 |

TABLE 4

| | Comparative example No. | | | | | | |
|---|---|---|---|---|---|---|---|
| | 2-1 | 2-2 | 2-3 | 2-4 | 2-5 | 2-6 | 2-7 |
| | | | | SIZE | | | |
| | 195/65R17 | 195/40R20 | 195/65R17 | 195/65R17 | 195/65R17 | 195/65R17 | 195/65R17 |
| (Formulation) | | | | | | | |
| NR | | | | 10 | 55 | 10 | 10 |
| SBR | 55 | 55 | 55 | 45 | | 45 | 45 |
| BR-1 | 35 | 35 | 35 | 35 | 35 | 35 | 35 |
| BR-2 | 10 | 10 | 10 | 10 | 10 | 10 | 10 |
| Carbon | 3 | 3 | 6 | 3 | 3 | 15 | 25 |
| Silica | 72 | 72 | 69 | 72 | 72 | 60 | 67 |
| Silane coupling agent | 7.2 | 7.2 | 6.9 | 7.2 | 7.2 | 6 | 6.7 |
| Oil | 30 | 30 | 30 | 30 | 30 | 30 | 30 |
| Resin | 5 | 5 | 5 | 5 | 5 | 5 | 5 |
| Wax | 1.5 | 1.5 | 1.5 | 1.5 | 1.5 | 1.5 | 1.5 |
| Anti-aging agent-1 | 2 | 2 | 2 | 2 | 2 | 2 | 2 |
| Anti-aging agent-2 | 1 | 1 | 1 | 1 | 1 | 1 | 1 |
| Sulfur | 1.5 | 1.5 | 1.5 | 1.5 | 1.5 | 1.5 | 1.5 |
| Vulcanization accelerator-1 | 2 | 2 | 2 | 2 | 2 | 2 | 2 |
| Vulcanization accelerator-2 | 1 | 1 | 1 | 1 | 1 | 1 | 1 |
| (Parameter) | | | | | | | |
| 30° C.tanδ | 0.187 | 0.187 | 0.195 | 0.198 | 0.210 | 0.210 | 0.288 |
| CB (part by mass) | 3 | 3 | 6 | 3 | 3 | 15 | 25 |
| Td(mm) | 7.9 | 7.8 | 8.2 | 8.1 | 8.0 | 8.1 | 8.2 |
| Dt(mm) | 686 | 664 | 664 | 664 | 686 | 686 | 686 |
| V(mm$^3$) | 44829249 | 28719183 | 28131992 | 28575587 | 43937124 | 43714093 | 43937124 |
| Wt(mm) | 201 | 200 | 198 | 199 | 197 | 196 | 197 |
| Ht(mm) | 127 | 78 | 78 | 78 | 127 | 127 | 127 |
| Dt-2 × Ht(mm) | 432 | 508 | 508 | 508 | 432 | 432 | 432 |
| (Dt$^2$ × π/4)/Wt | 1839 | 1731 | 1749 | 1740 | 1876 | 1886 | 1876 |
| (V + 1.5 × 10$^7$)/Wt | 297658 | 218596 | 219353 | 218973 | 299173 | 299562 | 299173 |
| (V + 2.0 × 10$^7$)/Wt | 322534 | 243596 | 244606 | 244098 | 324554 | 325072 | 324554 |

TABLE 4-continued

|  | Comparative example No. | | | | | | |
|---|---|---|---|---|---|---|---|
|  | 2-1 | 2-2 | 2-3 | 2-4 | 2-5 | 2-6 | 2-7 |
|  | | | | SIZE | | | |
|  | 195/65R17 | 195/40R20 | 195/65R17 | 195/65R17 | 195/65R17 | 195/65R17 | 195/65R17 |
| $(V + 2.5 \times 10^7)/Wt$ | 347409 | 268596 | 269859 | 269224 | 349935 | 350582 | 349935 |
| Aspect ratio (%) | 63.18 | 39.00 | 39.39 | 39.20 | 64.47 | 64.80 | 64.47 |
| CB × Wt | 603 | 600 | 1188 | 597 | 591 | 2940 | 4925 |
| $(30°\ C.\tan\delta/Td) \times 100$ | 2.37 | 2.40 | 2.38 | 2.44 | 2.63 | 2.59 | 3.51 |
|  | | | (Evaluation result) | | | | |
| Rolling resistance at high-speed running | 98 | 100 | 92 | 96 | 100 | 96 | 86 |
| Chipping resistance | 90 | 88 | 94 | 96 | 88 | 94 | 100 |
| Comprehensive evaluation | 188 | 188 | 186 | 192 | 188 | 190 | 186 |

Experiment 3

In this experiment, 225 size tires were prepared and evaluated.

After producing the test tires of Examples 3-1 to 3-5 and Comparative Examples 3-1 to 3-7 shown in Tables 5 and 6 in the same manner as in Experiment 1, each parameter was calculated by performing the same procedure. Then, in the same manner, a performance evaluation test was conducted and evaluated. In this experiment, the result in Comparative Example 3-5 was set as 100, when evaluating rolling resistance during high-speed running, and the result in Comparative Example 3-7 was set as 100, when evaluating chipping resistance. The results of each evaluation are shown in Tables 5 and 6.

TABLE 5

|  | Example No. | | | | |
|---|---|---|---|---|---|
|  | 3-1 | 3-2 | 3-3 | 3-4 | 3-5 |
|  | | | SIZE | | |
|  | 225/35R22 | 225/35R22 | 225/35R22 | 225/50R20 | 225/40R21 |
|  | (Formulation) | | | | |
| NR | 10 | 10 | 10 | 10 | 10 |
| SBR | 45 | 45 | 45 | 45 | 45 |
| BR-1 | 35 | 35 | 35 | 35 | 35 |
| BR-2 | 10 | 10 | 10 | 10 | 10 |
| Carbon | 6 | 15 | 25 | 6 | 6 |
| Silica | 84 | 82 | 82 | 84 | 84 |
| Silane coupling agent | 8.4 | 8.2 | 8.2 | 8.4 | 8.4 |
| Oil | 30 | 30 | 30 | 30 | 30 |
| Resin | 5 | 5 | 5 | 5 | 5 |
| Wax | 1.5 | 1.5 | 1.5 | 1.5 | 1.5 |
| Anti-aging agent-1 | 2 | 2 | 2 | 2 | 2 |
| Anti-aging agent-2 | 1 | 1 | 1 | 1 | 1 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
|  | (Parameter) | | | | |
| 30° C. tanδ | 0.255 | 0.296 | 0.344 | 0.255 | 0.255 |
| CB (part by mass) | 6 | 15 | 25 | 6 | 6 |
| Td(mm) | 7.8 | 7.9 | 8.0 | 8.2 | 8.1 |
| Dt(mm) | 716 | 718 | 717 | 734 | 713 |
| V(mm$^3$) | 36203610 | 37040131 | 35785417 | 50043281 | 40161995 |
| Wt(mm) | 229 | 231 | 226 | 227 | 228 |
| Ht(mm) | 79 | 80 | 79 | 113 | 90 |
| Dt-2 × Ht(mm) | 558 | 558 | 559 | 508 | 533 |
| $(Dt^2 \times \Pi/4)/Wt$ | 1758 | 1753 | 1787 | 1864 | 1751 |
| $(V + 1.5 \times 10^7)/Wt$ | 223597 | 225282 | 224714 | 286534 | 241939 |
| $(V + 2.0 \times 10^7)/Wt$ | 245431 | 246927 | 246838 | 308561 | 263868 |
| $(V + 2.5 \times 10^7)/Wt$ | 267265 | 268572 | 268962 | 330587 | 285798 |

TABLE 5-continued

| | Example No. | | | | |
|---|---|---|---|---|---|
| | 3-1 | 3-2 | 3-3 | 3-4 | 3-5 |
| | SIZE | | | | |
| | 225/35R22 | 225/35R22 | 225/35R22 | 225/50R20 | 225/40R21 |
| Aspect ratio (%) | 34.50 | 34.63 | 34.96 | 49.78 | 39.47 |
| CB × Wt | 1374 | 3465 | 5650 | 1362 | 1368 |
| (30° C . tanδ/Td) × 100 | 3.27 | 3.75 | 4.30 | 3.11 | 3.15 |
| (Evaluation result) | | | | | |
| Rolling resistance at high-speed running | 110 | 104 | 102 | 112 | 116 |
| Chipping resistance | 118 | 124 | 130 | 113 | 106 |
| Comprehensive evaluation | 228 | 228 | 232 | 225 | 222 |

TABLE 6

| | Comparative example No. | | | | | | |
|---|---|---|---|---|---|---|---|
| | 3-1 | 3-2 | 3-3 | 3-4 | 3-5 | 3-6 | 3-7 |
| | SIZE | | | | | | |
| | 225/60R20 | 225/50R20 | 225/60R20 | 225/60R20 | 225/60R20 | 225/60R20 | 225/60R20 |
| (Formulation) | | | | | | | |
| NR | | | | 10 | 55 | 10 | 10 |
| SBR | 55 | 55 | 55 | 45 | | 45 | 45 |
| BR-1 | 35 | 35 | 35 | 35 | 35 | 35 | 35 |
| BR-2 | 10 | 10 | 10 | 10 | 10 | 10 | 10 |
| Carbon | 3 | 3 | 6 | 3 | 3 | 15 | 25 |
| Silica | 87 | 87 | 84 | 87 | 87 | 75 | 82 |
| Silane coupling agent | 8.7 | 8.7 | 8.4 | 8.7 | 8.7 | 7.5 | 8.2 |
| Oil | 30 | 30 | 30 | 30 | 30 | 30 | 30 |
| Resin | 5 | 5 | 5 | 5 | 5 | 5 | 5 |
| Wax | 1.5 | 1.5 | 1.5 | 1.5 | 1.5 | 1.5 | 1.5 |
| Anti-aging agent-1 | 2 | 2 | 2 | 2 | 2 | 2 | 2 |
| Anti-aging agent-2 | 1 | 1 | 1 | 1 | 1 | 1 | 1 |
| Sulfur | 1.5 | 1.5 | 1.5 | 1.5 | 1.5 | 1.5 | 1.5 |
| Vulcanization accelerator-1 | 2 | 2 | 2 | 2 | 2 | 2 | 2 |
| Vulcanization accelerator-2 | 1 | 1 | 1 | 1 | 1 | 1 | 1 |
| (Parameter) | | | | | | | |
| 30° C.tanδ | 0.236 | 0.236 | 0.254 | 0.255 | 0.272 | 0.270 | 0.344 |
| CB (part by mass) | 3 | 3 | 6 | 3 | 3 | 15 | 25 |
| Td(mm) | 7.7 | 8.2 | 8.1 | 7.9 | 8.2 | 8.1 | 8.0 |
| Dt(mm) | 778 | 736 | 732 | 735 | 777 | 776 | 778 |
| V(mm$^3$) | 62176957 | 51904024 | 50611309 | 51375765 | 62080258 | 61350140 | 61631545 |
| Wt(mm) | 228 | 233 | 232 | 231 | 228 | 227 | 226 |
| Ht(mm) | 135 | 114 | 112 | 114 | 135 | 134 | 135 |
| Dt-2 × Ht(mm) | 508 | 508 | 508 | 507 | 507 | 508 | 508 |
| (Dt$^2$ × π/4)/Wt | 2085 | 1826 | 1814 | 1837 | 2080 | 2083 | 2103 |
| (V + 1.5 × 10$^7$)/Wt | 338495 | 287142 | 282807 | 287341 | 338071 | 336344 | 339078 |
| (V + 2.0 × 10$^7$)/Wt | 360425 | 308601 | 304359 | 308986 | 360001 | 358371 | 361202 |
| (V + 2.5 × 10$^7$)/Wt | 382355 | 330060 | 325911 | 330631 | 381931 | 380397 | 383325 |
| Aspect ratio (%) | 59.21 | 48.93 | 48.28 | 49.35 | 59.21 | 59.03 | 59.73 |
| CB × Wt | 684 | 699 | 1392 | 693 | 684 | 3405 | 5650 |
| (30° C.tanδ/Td) × 100 | 3.06 | 2.88 | 3.14 | 3.23 | 3.32 | 3.33 | 4.30 |
| (Evaluation result) | | | | | | | |
| Rolling resistance at high-speed running | 96 | 100 | 96 | 96 | 100 | 96 | 88 |
| Chipping resistance | 94 | 90 | 96 | 96 | 86 | 96 | 100 |
| Comprehensive evaluation | 190 | 190 | 192 | 192 | 186 | 192 | 188 |

Summary of Experiments 1 to 3

From the results of Experiments 1 to 3 (Tables 1 to 6), for tires of any size, 175 size, 195 size, 225 size, it turns out that it is possible to provide a pneumatic tire in which the rolling resistance at high-speed running is sufficiently reduced and the chipping resistance is improved, when the above (formula 1) and (formula 2) are satisfied.

Then, it turns out that, by satisfying each of the requirements specified in claim 2 and thereafter, it is possible to provide a tire with further improved rolling resistance and chipping resistance at high-speed running.

On the other hand, when either (formula 1) or (formula 2) is not satisfied, the rolling resistance at high-speed running cannot be sufficiently reduced, and the chipping resistance cannot be sufficiently improved.

Experiment 4

Next, three types of tires (Examples 4-1 to 4-3) in which the relationship between the virtual volume V and the cross-sectional width Wt did not differ significantly were produced with the same formulation and evaluated in the same manner. Here, in addition to the evaluation of rolling resistance and chipping resistance at high-speed running, the ride comfort was also evaluated.

Specifically, each test tire was mounted on all wheels of a vehicle (domestic FF vehicle, displacement 2000 cc), filled with air so that the internal pressure became 250 kPa, and then driven on a dry road test course. The driver sensory-tested the ride comfort when driving 10 laps at a speed of 100 km/h on a 5-point scale. After summing up the evaluations by 20 drivers, the evaluation was indexed based on the following formula, with the total score in Example 4-3 being 100, and the riding comfort was relatively evaluated. A larger value indicates better riding comfort.

Ride comfort=[(Total evaluation score of test tire)/(Total evaluation score of Example 4-3)]×100

Then, as in Experiments 1 to 3, each evaluation result was totaled to obtain a comprehensive evaluation. The results of each evaluation are shown in Table 7.

TABLE 7

| | Example No. | | |
|---|---|---|---|
| | 4-1 | 4-2 | 4-3 |
| | | SIZE | |
| | 175/55R18 | 195/50R19 | 225/45R20 |
| (Formulation) | | | |
| NR | 10 | 10 | 10 |
| SBR | 45 | 45 | 45 |
| BR-1 | 35 | 35 | 35 |
| BR-2 | 10 | 10 | 10 |
| Carbon | 8 | 8 | 8 |
| Silica | 67 | 67 | 67 |
| Silane coupling agent | 6.7 | 6.7 | 6.7 |
| Oil | 30 | 30 | 30 |
| Resin | 5 | 5 | 5 |
| Wax | 1.5 | 1.5 | 1.5 |
| Anti-aging agent-1 | 2 | 2 | 2 |
| Anti-aging agent-2 | 1 | 1 | 1 |
| Sulfur | 1.5 | 1.5 | 1.5 |
| Vulcanization accelerator-1 | 2 | 2 | 2 |
| Vulcanization accelerator-2 | 1 | 1 | 1 |
| (Parameter) | | | |
| 30° C. tanδ | 0.200 | 0.200 | 0.200 |
| CB (part by mass) | 8 | 8 | 8 |
| Td(mm) | 7.6 | 8.1 | 8.3 |
| Dt(mm) | 649 | 679 | 710 |
| V(mm³) | 30354118 | 36015050 | 43478150 |
| Wt(mm) | 182 | 201 | 225 |
| Ht(mm) | 96 | 98 | 101 |
| Dt-2 × Ht(mm) | 457 | 483 | 508 |
| (Dt² × Π/4)/Wt | 1818 | 1801 | 1760 |
| (V + 1.5 × 10⁷)/Wt | 249198 | 253806 | 259903 |
| (V + 2.0 × 10⁷)/Wt | 276671 | 278682 | 282125 |
| (V + 2.5 × 10⁷)/Wt | 304144 | 303557 | 304347 |
| Aspect ratio (%) | 52.75 | 48.76 | 44.89 |
| CB × Wt | 1456 | 1608 | 1800 |
| (30° C . tanδ/Td) × 100 | 2.63 | 2.47 | 2.41 |
| (Evaluation result) | | | |
| Rolling resistance at high-speed running | 117 | 106 | 100 |
| Chipping resistance | 106 | 104 | 100 |
| Ride comfort | 116 | 108 | 100 |
| Comprehensive evaluation | 339 | 318 | 300 |

Table 7 shows that, when there is no large difference in the relationship between the virtual volume V and the cross-sectional width Wt, the rolling resistance at high-speed running and durability are both improved, as the cross-sectional width Wt becomes smaller as from less than 205 mm to less than 200 mm, and as the aspect ratio increases. That is, it can be seen a remarkable effect is exhibited.

Although the present disclosure has been described above based on the embodiments, the present disclosure is not limited to the above embodiments. Various modifications can be made to the above embodiments within the same and equal range as the present disclosure.

The present disclosure (1) is;
a pneumatic tire having a tread portion, wherein
at least one of the rubber layers forming the tread portion contains a rubber component containing isoprene-based rubber, styrene-butadiene rubber and butadiene rubber, and more than 5 parts by mass and 25 parts by mass or less of carbon black with respect to 100 parts by mass of the rubber component; and,
when the cross-sectional width of the tire is Wt (mm), the outer diameter is Dt (mm), and the volume of the space occupied by the tire is the virtual volume V (mm³), when the tire is installed on a standardized rim and the internal pressure is 250 kPa, the tire satisfies following (formula 1) and (formula 2):

$$1700 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2)}$$

The present disclosure (2) is the pneumatic tire according to the present disclosure (1), wherein the following (formula 3) is satisfied.

$$[(V+2.0\times10^7)/Wt] \leq 2.88\times10^5 \quad \text{(formula 3)}$$

The present disclosure (3) is the pneumatic tire according to the present disclosure (2), wherein the following (formula 4) is satisfied.

$$[(V+2.5\times10^7)/Wt] \le 2.88\times10^5 \qquad \text{(formula 4)}$$

The present disclosure (4) is the pneumatic tire of any combination of the present disclosures (1) to (3), wherein, when the outer diameter of the tire is Dt (mm) and the cross-sectional height of the tire is Ht (mm), when the tire is installed on a standardized rim and the internal pressure is 250 kPa, (Dt−2×Ht) is 470 (mm) or more.

The present disclosure (5) is the pneumatic tire of any combination of the present disclosures (1) to (4), which has an aspect ratio of 40% or more.

The present disclosure (6) is the pneumatic tire according to the present disclosure (5), which has an aspect ratio of 45% or more.

The present disclosure (7) is the pneumatic tire according to the present disclosure (6), which has an aspect ratio of 47.5% or more.

The present disclosure (8) is the pneumatic tire according to the present disclosure (7), which has an aspect ratio of 50% or more.

The present disclosure (9) is the pneumatic tire of any combination of the present disclosures (1) to (8), wherein the loss tangent (30° C. tan δ) of the rubber layer of the tread portion measured under the conditions of 30° C., frequency of 10 Hz, initial strain of 5%, and dynamic strain rate of 1% is less than 0.15.

The present disclosure (10) is the pneumatic tire of any combination of the present disclosures (1) to (9), wherein the amount of carbon black CB (parts by mass) and the cross-sectional width Wt (mm) of the tire satisfy the following (formula 5).

$$CB \times Wt \ge 900 \qquad \text{(formula 5)}$$

This disclosure (11) is the pneumatic tire according to the present disclosure (10), wherein following (formula 6) is satisfied.

$$CB \times Wt \ge 1500 \qquad \text{(formula 6)}$$

The present disclosure (12) is the pneumatic tire of any combination of the present disclosures (1) to (11), wherein the tread portion has circumferential grooves continuously extending in the tire circumferential direction, and the ratio of the groove width $L_{80}$ at a depth of 80% of the maximum depth of the circumferential groove to the groove width $L_0$ of the circumferential groove on the ground contact surface of the tread portion ($L_{80}/L_0$) is 0.3 to 0.7.

The present disclosure (13) is the pneumatic tire of any combination of the present disclosures (1) to (12), wherein the tread portion has a plurality of circumferential grooves continuously extending in the tire circumferential direction, and the total cross-sectional area of the plurality of circumferential grooves is 10 to 30% of the cross-sectional area of the tread portion.

The present disclosure (14) is the pneumatic tire of any combination of the present disclosures (1) to (13), wherein the tread portion has a plurality of lateral grooves extending in the tire axial direction, and the total volume of the plurality of lateral grooves is 2.0 to 5.0% of the volume of the tread portion The present disclosure (15) is the pneumatic tire according to the present disclosure (14), wherein at least one of the lateral grooves is a lateral groove in which groove width/groove depth is 0.50 to 0.80.

The present disclosure (16) is the pneumatic tire of any combination of the present disclosures (1) to (15), wherein Dt is less than 685 (mm), where Dt (mm) is the outer diameter of the tire when the tire is installed on a standardized rim and the internal pressure is 250 kPa.

The present disclosure (17) is the pneumatic tire of any combination of the present disclosures (1) to (16), wherein the cross-sectional width Wt (mm) is less than 205 mm.

The present disclosure (18) is the pneumatic tire according to the present disclosure (17), wherein the cross-sectional width Wt (mm) is less than 200 mm.

The present disclosure (19) is the pneumatic tire according to the present disclosure (18), wherein, when the thickness of the rubber layer of the tread layer in the radial direction of the tire is Td (mm), and the loss tangent of the rubber layer measured under the conditions of 30° C., frequency of 10 Hz, initial strain of 5%, and dynamic strain rate of 1% is 30° C. tan δ, following (formula 7) is satisfied.

$$(30° C. \tan \delta/Td) \times 100 \ge 2.00 \qquad \text{(formula 7)}$$

The present disclosure (20) is the pneumatic tire according to the present disclosure (19), wherein following (formula 8) is satisfied.

$$(30° C. \tan \delta/Td) \times 100 \ge 2.50 \qquad \text{(formula 8)}$$

The present disclosure (21) is the pneumatic tire according to the present disclosure (20), wherein following (formula 9) is satisfied.

$$(30° C. \tan \delta/Td) \times 100 \ge 3.00 \qquad \text{(formula 9)}$$

The present disclosure (22) is the pneumatic tire of any combination of the present disclosures (1) to (21), wherein the tread portion is formed from a plurality of rubber layers, and the rubber composition is used in the cap rubber layer of the tread.

The present disclosure (23) is the pneumatic tire of any combination of the present disclosures (1) to (22), which is a pneumatic tire for a passenger car.

What is claimed is:

1. A pneumatic tire having a tread portion, wherein
   at least one of the rubber layers forming the tread portion contains a rubber component containing isoprene-based rubber, styrene-butadiene rubber and butadiene rubber, and more than 10 parts by mass and 25 parts by mass or less of carbon black with respect to 100 parts by mass of the rubber component;
   when the cross-sectional width of the tire is Wt (mm), the outer diameter is Dt (mm), and the volume of the space occupied by the tire is the virtual volume V (mm$^3$), and when the tire is installed on a standardized rim and the internal pressure is 250 kPa, the tire satisfies (formula 1), (formula 3) and (formula 4):

$$1700 \le (Dt^2 \times \pi/4)/Wt \le 2827.4 \qquad \text{(formula 1)}$$

$$[(V+2.0\times10^7)/Wt] \le 2.44\times10^5 \qquad \text{(formula 3)}$$

$$[(V+2.5\times10^7)/Wt] \le 2.88\times10^5 \qquad \text{(formula 4)};$$

the cross-sectional width Wt (mm) is 176 mm or more; and
   when the cross-sectional height of the tire is Ht (mm), when the tire is installed on a standardized rim and the internal pressure is 250 kPa, (Dt−2×Ht) is 470 (mm) or more; and
   wherein the aspect ratio is 50% or more.

2. The pneumatic tire according to claim 1, wherein the loss tangent (30° C. tan δ) of the rubber layer of the tread portion measured under the conditions of 30° C., frequency of 10 Hz, initial strain of 5%, and dynamic strain rate of 1% is less than 0.15.

3. The pneumatic tire according to claim 1, wherein the tread portion has circumferential grooves continuously extending in the tire circumferential direction, and the ratio of the groove width $L_{80}$ at a depth of 80% of the maximum depth of the circumferential groove to the groove width $L_0$ of the circumferential groove on the ground contact surface of the tread portion ($L_{80}/L_0$) is 0.3 to 0.7.

4. The pneumatic tire according to claim 1, wherein the tread portion has a plurality of circumferential grooves extending continuously in the tire circumferential direction, and the total cross-sectional area of the plurality of circumferential grooves is 10 to 30% of the cross-sectional area of the tread portion.

5. The pneumatic tire according to claim 1, wherein, when the outer diameter of the tire is Dt (mm) when the tire is installed on a standardized rim and the internal pressure is 250 kPa, the Dt is less than 685 (mm).

6. The pneumatic tire according to claim 1, wherein the tread portion is formed from a plurality of rubber layers, and the rubber composition is used in the cap rubber layer of the tread.

7. The pneumatic tire according to claim 1, which is a pneumatic tire for a passenger car.

8. The pneumatic tire according to claim 1, wherein the amount of carbon black CB (parts by mass) and the cross-sectional width Wt (mm) of the tire satisfy the following (formula 5): CB×Wt≥900 (formula 5).

9. The pneumatic tire according to claim 8, wherein the following (formula 6) is satisfied: CB×Wt≥1500 (formula 6).

10. The pneumatic tire according to claim 1, wherein the tread portion has a plurality of lateral grooves extending in the tire axial direction, and the total volume of the plurality of lateral grooves is 2.0 to 5.0% of the volume of the tread portion.

11. The pneumatic tire according to claim 10, wherein at least one of the lateral grooves is a lateral groove in which groove width/groove depth is 0.50 to 0.80.

12. The pneumatic tire according to claim 1, wherein the cross-sectional width Wt (mm) is less than 205 mm.

13. The pneumatic tire according to claim 12, wherein the cross-sectional width Wt (mm) is less than 200 mm.

14. The pneumatic tire according to claim 1, wherein, when the thickness of the rubber layer of the tread layer in the radial direction of the tire is Td (mm), and the loss tangent of the rubber layer measured under the conditions of 30° C., frequency of 10 Hz, initial strain of 5%, and dynamic strain rate of 1% is 30° C. tan δ, following (formula 7) is satisfied $$(30° \text{ C. tan } \delta/Td) \times 100 \geq 2.00 \qquad \text{(formula 7)}.$$

15. The pneumatic tire according to claim 14, wherein the following (formula 8) is satisfied: (30° C. tan δ/Td)×100≥2.50 (formula 8).

16. The pneumatic tire according to claim 15, wherein the following (formula 9) is satisfied: (30° C. tan δ/Td)×100≥3.00 (formula 9).

* * * * *